United States Patent [19]

Molt

[11] 4,358,555

[45] Nov. 9, 1982

[54] STABILIZERS FOR HALOGEN CONTAINING POLYMERS COMPRISING ALKYLTIN COMPOUNDS, ZINC MERCAPTOESTERS AND BASIC ALKALI OR ALKALINE EARTH METAL COMPOUNDS

[75] Inventor: Kenneth R. Molt, Cincinnati, Ohio

[73] Assignee: Carstab Corporation, Reading, Ohio

[21] Appl. No.: 269,082

[22] Filed: Jun. 2, 1981

[51] Int. Cl.$^3$ .............................................. C08K 5/58
[52] U.S. Cl. .............................. 524/181; 252/400 R; 524/180; 524/392
[58] Field of Search .................. 260/45.75 W, 45.8 N, 260/45.85 H, 45.75 S; 524/180, 181; 252/400 R

[56] References Cited

U.S. PATENT DOCUMENTS

| | | | |
|---|---|---|---|
| 2,723,965 | 11/1955 | Leestner et al. | 260/45.75 W |
| 4,132,691 | 1/1979 | Ejk | 260/45.75 W |
| 4,331,587 | 5/1982 | Jennings et al. | 524/181 |

FOREIGN PATENT DOCUMENTS

| | | |
|---|---|---|
| 50-89451 | 7/1975 | Japan . |
| 52-37956 | 3/1977 | Japan . |

OTHER PUBLICATIONS

Modern Plastics, Dec. 1949, pp. 111–116, 156–162, Lally et al.
CA 83, 207117c, (1975).

*Primary Examiner*—V. P. Hoke
*Attorney, Agent, or Firm*—Richard J. Sheridan; Gerald K. White

[57] ABSTRACT

Compositions which are useful as stabilizers for halogen containing polymers are provided comprising (1) at least one alkyltin mercaptide, (2) at least one zinc mercaptoester, and (3) at least one basic alkali or alkaline earth metal compound. Also provided are polymer compositions containing these stabilizers.

10 Claims, No Drawings

STABILIZERS FOR HALOGEN CONTAINING POLYMERS COMPRISING ALKYLTIN COMPOUNDS, ZINC MERCAPTOESTERS AND BASIC ALKALI OR ALKALINE EARTH METAL COMPOUNDS

BACKGROUND OF THE INVENTION

Halogen containing polymers, especially chlorine containing polymers, have attained a high degree of commercial significance and use. Polyvinyl chloride (PVC), in particular, is widely used in packaging, siding, pipe and extruded shapes. Such large scale and diverse use of the halogen containing polymers, as exemplified by PVC, is the result, at least in part, of the stabilization of such polymers against degradation caused by light and/or heat. PVC is known to degrade upon prolonged exposure to light and/or heat during processing and use, with attendant darkening or change of color and loss of physical properties (e.g. tensile, flexural and impact strengths). Such degradation detracts from the usefulness of PVC and imposes restrictions on the conditions and apparatus for processing and manufacturing PVC articles. Thus, for example, the service life of a PVC article may be significantly limited, the conditions under which the PVC article is used severely restricted and the manufacturing conditions very narrow.

One particularly troublesome form of degradation of halogen containing polymers occurs when they are processed into articles by methods employing heat to melt or soften the polymer. Color changes can occur in the polymer during the first few minutes (e.g. about 1 to 10 minutes) of processing at high processing temperatures (e.g. about 175° C. to 200° C.). This color change during the first several minutes of exposure to high processing temperatures is commonly referred to as early color or early discoloration. Avoidance of such early color or early discoloration is notably important in a number of applications (e.g. plastic pipe) and is particularly important where white or light colored products are to be made. It is, of course, also important to prevent or reduce discoloration and deterioration of the organic polymer during extended exposure to high processing temperatures, as may be encountered in some processes or fabricating methods.

To prevent or reduce the discoloration and deterioration of halogen containing polymers during processing at elevated temperatures and during exposure of the fabricated product to elevated temperatures under use conditions, the art has added various materials, known as stabilizers, to the polymers. Most notable among these stabilizers have been the organotin stabilizers. These organotin stabilizers have been found to be particularly effective in the prevention of early discoloration of halogen containing polymers. However, while the organotin stabilizers are capable of lessening or preventing early discoloration, they have in recent years become increasingly expensive, with the result that in relatively low cost products such as pipe the cost of such stabilizers may be difficult to bear.

Attempts have been made to replace the organotin stabilizers, either in part or altogether, with lower cost materials. Various combinations of organotin compounds with other organometallic compounds have thus been developed. One such combination, disclosed in Japanese Kokai No. 77 37, 956 by Minagawa et al, contains at least one alkyl tin compound selected from monoalkyl and dialkyl tin compounds, and at least one mercaptide, salt or ester of mercaptocarboxylic acid, or salt or ester of maleic acid with metals selected from Mg, Ca, Sr, Ba, Zn, Sn or Zr. As the alkyl tin compounds there are disclosed such compounds as, for example, dimethyltin oxide, dimethyltin sulfide, dibutyltin bis (isooctylmercaptoacetate) and monobutyltin tris (isooctylmercaptopropionate). The metal mercaptides, salts or esters of mercaptocarboxylic acids include such compounds as, for example, zinc bis (isooctyl thioglycolate). The complete elimination of organotin compounds was attempted in Japanese Kakai 75 89,451 to Shinkawa. Disclosed are stabilizers for halogen-containing resins containing organozinc compounds and organic acid alkali or alkaline earth metal salts. The organozinc compounds have the formula:

where SX is a mercaptan or mercaptate residue, and Y is the same as SX or an organic acid residue. An example of such organozinc compounds is

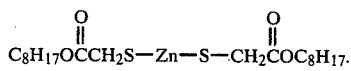

SUMMARY OF THE INVENTION

The present invention relates to novel compositions comprising (1) at least one alkyltin mercaptide, (2) at least one zinc mercaptoester, and (3) at least one basic alkali or alkaline earth metal compound. This invention also relates to novel compositions comprising (1) at least one alkyltin mercaptide, (2) at least one alkyltin sulfide or oxide, (3) at least one zinc mercaptoester, and (4) at least one basic alkali or alkaline earth metal compound. These compositions are useful as stabilizers for halogen containing polymers.

The present invention also relates to novel polymer compositions which have improved resistance to color change upon exposure to heat during processing comprising a halogen containing polymer, at least one alkyltin mercaptide, at least one zinc mercaptoester, and at least one basic alkali or alkaline earth metal compound. This invention also relates to polymer compositions which are stabilized against the deteriorative effects of heat comprising a halogen-containing polymer, at least one alkyltin mercaptide, at least one alkyltin sulfate or oxide, at least one zinc mercaptoester, and at least one basic alkali or alkaline earth metal compound. These polymeric compositions are useful in the manufacture of rigid articles such as pipe.

DESCRIPTION OF THE PREFERRED EMBODIMENTS

There has now ben unexpectedly found in accordance with this invention a stabilizer composition of improved effectiveness in stabilizing halogen containing polymers against the deteriorative effects of heat. Polymer compositions having improved resistance to color changes upon exposure to heat during processing are also provided in the practice of this invention.

In accordance with this invention there is provided (a) stabilizer compositions comprising (1) at least one alkyltin mercaptide, (2) at least one zinc mercaptoester, and (3) at least one basic alkali or alkaline earth metal compound; (b) stabilizer compositions comprising (1) at least one alkyltin mercaptide, (2) at least one alkyltin sulfide or oxide, (3) at least one zinc mercaptoester, and (4) at least one basic alkali or alkaline earth metal compound; (c) polymer compositions comprising (1) a halogen containing polymer, (2) at least one alkyltin mercaptide, (3) at least one zinc mercaptoester, and (4) at least one basic alkali or alkaline earth metal compound; and (d) polymer compositions comprising (1) a halogen containing polymer, (2) at least one alkyltin mercaptide, (3) at least one alkyltin sulfide or oxide, (4) at least one zinc mercaptoester, and (5) at least one basic alkali or alkaline earth metal compound.

The halogen containing polymers which are stabilized by the stabilizer compositions of this invention and which are useful in the polymer compositions of this invention include, for example, halogenated polyolefin homopolymers, halogenated polyolefin copolymers, polymer blends containing a halogenated polyolefin homopolymer or copolymer, vinyl halide homopolymers, vinyl halide copolymers and polymer blends containing vinyl halide homopolymer or copolymers. As vinyl halide homopolymers, vinyl halide copolymers and polymer blends containing vinyl halide homopolymers or vinyl halide copolymers usable in the practice of this invention there, for example, may be used (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate and other alkyl methacrylates, methyl alpha chloracrylate, styrene, vinyl ethers such as vinyl ethyl ether, vinyl chloroethyl ether, vinyl phenyl ether; vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrile-butadiene-styrene copolymer, and polyvinyl chloride and polyethylene and polymethyl methacrylate. Typical vinyl halide copolymers usable in this invention include vinyl chloride-vinyl acetate (87:13), vinyl chloride-vinylidene chloride (95:5), vinyl chloride-diethylfumarate (95:5), vinyl chloride-trichloroethylene (95:5) and vinyl chloride-2-ethylhexyl acrylate (80:20). The polymer blends usable in the practice of this invention comprise physical blends of at least two distinct polymeric species and contain from 25 to 95 weight percent of vinyl halide homopolymer. The vinyl halide copolymers usable in the practice of this invention are copolymers comprising from 25 to 95 mole percent vinyl halide units.

As used herein, the term alkyltin mercaptide refers to organotin compounds containing a tetravalent tin atom having bonded thereto at least one substituted or unsubstituted hydrocarbon group attached to the tin atom directly through a carbon atom, and at least one mercaptoester group bonded to the tin atom directly through the sulfur atom. More particularly, the alkyltin mercaptides useful in this invention are represented by the formula:

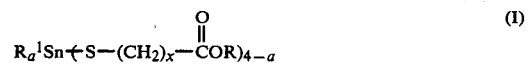

where
$R^1$ is $C_1$ to $C_{12}$ straight or branched-chain, alkyl;
R is $C_1$ to $C_{20}$ straight or branched-chain, saturated or unsaturated alkyl;
a = 1 or 2; and
x = 1 or 2.

Examples of alkyltin mercaptides useful in the practice of this invention include, but are not limited to, the compounds shown in Table I.

TABLE I

| Alkyltin Mercaptide Number | |
|---|---|
| 1 | $(CH_3)_2Sn(SCH_2\overset{O}{\overset{\|}{C}}OC_8H_{17})_2$ |
| 2 | $(C_4H_9)_2Sn(SCH_2\overset{O}{\overset{\|}{C}}OC_8H_{17})_2$ |
| 3 | $(C_8H_{17})_2Sn(SCH_2\overset{O}{\overset{\|}{C}}OC_8H_{17})_2$ |
| 4 | $(CH_3)_2Sn(SCH_2CH_2\overset{O}{\overset{\|}{C}}OC_8H_{17})_2$ |
| 5 | $(CH_3)_2Sn(SCH_2\overset{O}{\overset{\|}{C}}OC_{18}H_{37})_2$ |
| 6 | $(C_8H_{17})_2Sn(SCH_2CH_2\overset{O}{\overset{\|}{C}}OC_8H_{17})_2$ |
| 7 | $CH_3Sn(SCH_2\overset{O}{\overset{\|}{C}}OC_8H_{17})_3$ |
| 8 | $CH_3Sn(SCH_2CH_2\overset{O}{\overset{\|}{C}}OC_8H_{17})_3$ |
| 9 | $C_8H_{17}Sn(SCH_2\overset{O}{\overset{\|}{C}}OC_8H_{17})_3$ |
| 10 | $C_4H_9Sn(SCH_2\overset{O}{\overset{\|}{C}}OC_2H_5)_3$ |
| 11 | $(CH_3)_2Sn(SCH_2\overset{O}{\overset{\|}{C}}OC_{18}H_{35})_2$ |

The zinc mercaptoesters useful in the practice of this invention are organozinc compounds having two mercaptoester groups each bonded to the zinc atom through the sulfur atom, and have the formula:

where
x = 1 or 2
R is as previously defined.

Examples of zinc mercaptoesters useful in the practice of this invention include, but are not limited to, the compounds illustrated in Table II.

TABLE II

| Zinc Mercaptoester Cmpd. Designation | |
|---|---|
| A | $Zn(SCH_2\overset{O}{\overset{\|}{C}}OC_8H_{17})_2$ |
| B | $Zn(SCH_2CH_2\overset{O}{\overset{\|}{C}}OC_8H_{17})_2$ |
| C | $Zn(SCH_2\overset{O}{\overset{\|}{C}}OC_{18}H_{37})_2$ |
| D | $Zn(SCH_2CH_2\overset{O}{\overset{\|}{C}}OC_{18}H_{35})_2$ |
| E | $Zn(SCH_2\overset{O}{\overset{\|}{C}}OC_2H_5)_2$ |

The alkyltin sulfides or oxides useful in the practice of this invention are organotin compounds having a tetravalent tin atom which has two alkyl groups each bonded thereto through a carbon atom, and a sulfur or oxygen atom bonded exclusively to the tin atom. These alkyltin sulfides or oxides have the formula:

$$R^1-\underset{\underset{\|}{W}}{Sn}-R^1 \quad \text{(III)}$$

where W is oxygen or sulfur and $R^1$ is as previously defined.

Examples of alkyltin sulfides and oxides which are useful in the practice of this invention include, but are not limited to, the compounds illustrated in Table III.

TABLE III

| Alkyltin Sulfide or Oxide Designation | |
|---|---|
| 12 | $(C_4H_9)_2SnO$ |
| 13 | $(CH_3)_2SnS$ |
| 14 | $(C_4H_9)_2SnS$ |
| 15 | $(C_8H_{17})_2SnS$ |

The term basic alkali or alkaline earth metal compounds as used herein refers to compounds selected from the group consisting of oxides, hydroxides, sulfides, carboxylates of $C_2$ to $C_8$ carboxylic acids, silicates, phosphates, borates and carbonates of alkali metals or alkaline earth metals. Preferably, the alkali metals are selected from Li, Na and K, and the alkaline earth metals are selected from Mg, Ca, Sr and Ba.

Examples of basic alkali or alkaline earth metal compounds include, but are not limited to, $Ca(OH)_2$, $Mg(OH)_2$, LiOH, calcium acetate, magnesium acetate, barium acetate, sodium propionate, $Na_3BO_4$, $K_2CO_3$, and sodium silicate.

The amount of each component in the stabilizer compositions of this invention may vary over a wide range. Generally, however, the stabilizer compositions comprise about 5% to about 90%, preferably about 10% to about 30%, alkyltin mercaptide; about 5% to about 90%, preferably about 20% to about 60%, zinc mercaptester; and about 5% to about 60%, perferably about 20% to about 60%, basic alkali or alkaline earth metal compound, all percentages being by weight based on the total weight of the stabilizer composition. When the alkyltin sulfides or oxides are employed in the stabilizer compositions of this invention, they are utilized in amounts up to 50% by weight of the combined weight of the alkyltin mercaptide and alkyltin sulfide or oxide present in the stabilizer composition.

Likewise the amount of stabilizer composition employed in the practice of the polymer compositions of this invention may vary over a wide range. It is only necessary that there be present in the polymer composition at least a stabilizingly effective amount of the stabilizer compositions. In general, as little as 0.05 parts by weight of stabilizer composition per hundred parts by weight of halogen containing polymer will be stabilizingly effective. While there is no critical upper limit to the amount of stabilizer composition which can be employed, amounts in excess of about 15 parts by weight of stabilizer composition per hundred parts by weight of halogen containing polymer do not yield an increase in effectiveness commensurate with the additional amount of stabilizer employed. Preferably, the stabilizer compositions of this invention are employed in amounts from about 0.2 to about 7 parts by weight per hundred parts of halogenated polymer.

In the practice of the polymer composition of this invention there may be present, in addition to the halogen containing polymer and stabilizer composition, conventional additives such as fillers, pigments, plasticizers, dyes, lubricants, antioxidants and ultraviolet light stabilizers well known in the plastics art. Among the fillers, such materials as calcined clays, calcium carbonate and talcs may be used. Such materials as titanium dioxide, carbon black and iron oxide may be employed as pigments. Included among the well known plasticizers which are usable are phthalates, sebacates, adipates, phosphates and fatty esters having between 16 and 150 carbon atoms. Well known lubricants which may be used include hydrocarbon waxes, stearyl stearate, cetyl palmitate and other ester waxes. Useful antioxidants include tricresyl phosphite, 2,6-di-t-butyl-4-methyl phenol, 2,6-di-t-butyl-4-decyloxy phenol and 2-t-butyl-4-octadecyloxy phenol.

Methods well-known in the art may be employed to prepare the stabilizer compositions of this invention using conventional equipment. The components may be blended together in any order in any convenient manner which provides uniform dispersion of each component throughout the mixture.

The polymer compositions according to this invention may be prepared by methods well known in the art and by the use of conventional equipment (e.g. a Henschel blender). One such method comprises blending the premixed stabilizer composition to the halogen containing polymer on a two roll mill. In another method the stabilizer composition may be added to the halogen containing polymer with continuous blending in a Henschel blender. The important consideration is that the stabilizer composition and halogen containing polymer be thoroughly blended together.

The stabilized halogen containing polymer compositions of this invention may be used to form articles of manufacture, e.g. pipe. A variety of conventional molding techniques may be employed to form the stabilized compositions into any desired shape.

The following examples illustrate this invention. Unless otherwise indicated, in the examples and throughout this specification, all amounts, parts and percentages are by weight.

EXAMPLES 1-24

Several mixtures are prepared by dry blending to 110° C. in a Henschel high intensity mixer (Model 2JSS) 100.0 parts of polyvinyl chloride (GEON 103EP-F-76 available commercially from B. F. Goodrich Chemical Company) with 3.0 parts of fine particle size calcium carbonate coated with calcium stearate, 1.0 part titanium dioxide, 1.2 parts of paraffin wax (AD-VAWAX ® 165 paraffin wax available commercially from Carstab Corporation), 0.60 part calcium stearate, 0.15 part of an oxidized low molecular weight ethylene homopolymer (AC629A available commercially from Allied Chemical Corporation), and each in turn of the stabilizer compositions listed in Table A in the amounts indicated in Table A, said amounts being parts by weight per hundred parts of polyvinyl chloride. The resulting mixture is masticated on a two roll mill at about 193° C. Samples are taken at one minute intervals beginning after the first introduction of the mix to the mill.

The appearance of each sample taken from the mill is evaluated using the following scale:

10 9 8 7 6 5 4 3 2 1 0

White ———→Tan-Orange———→Burn

The results of these tests are indicated in Table A.

TABLE A

| Ex. No. | Stabilizer Composition | Parts by Weight | \multicolumn{10}{c}{Minutes of Milling} |
|---|---|---|---|---|---|---|---|---|---|---|---|---|
|  |  |  | 1 | 2 | 3 | 4 | 5 | 6 | 7 | 8 | 9 | 10 |
|  |  |  | \multicolumn{10}{c}{Color} |
| 1* | Alkyltin mercaptide no. 1 from Table I | 0.25 | 10 | 9 | 8 | 7 | 7 | 6 | 5 | 5 | 4 | 4 |
| 2* | Alkyltin mercaptide no. 1 from Table I | 0.09 | 10 | 10 | 10 | 9 | 8 | 5 | 2 | 0 | 0 | 0 |
|  | Zinc cmpd A from Table II | 0.16 |  |  |  |  |  |  |  |  |  |  |
| 3* | Zinc cmpd A from Table II | 0.30 | 10 | 10 | 9 | 8 | 6 | 5 | 5 | 4 | 4 | 4 |
|  | Ca(OH)$_2$ | 0.30 |  |  |  |  |  |  |  |  |  |  |
| 4 | Alkyltin mercaptide no. 1 from Table I | 0.09 |  |  |  |  |  |  |  |  |  |  |
|  | Zinc cmpd A from Table II | 0.16 | 10 | 10 | 10 | 10 | 9 | 8 | 7 | 7 | 7 | 7 |
|  | Ca(OH)$_2$ | 0.18 |  |  |  |  |  |  |  |  |  |  |
| 5* | Alkyltin mercaptide no. 7 from Table I | 0.175 | 10 | 10 | 10 | 9 | 8 | 7 | 7 | 6 | 6 | 5 |
|  | Alkyltin sulfide no. 13 from Table III | 0.075 |  |  |  |  |  |  |  |  |  |  |
| 6* | Alkyltin mercaptide no. 7 from Table I | 0.07 |  |  |  |  |  |  |  |  |  |  |
|  | Alkyltin sulfide no. 13 from Table III | 0.03 | 10 | 10 | 9 | 8 | 7 | 6 | 5 | 0 | 0 | 0 |
|  | Zinc cmpd A from Table II | 0.15 |  |  |  |  |  |  |  |  |  |  |
| 7 | Alkyltin mercaptide no. 7 from Table I | 0.07 |  |  |  |  |  |  |  |  |  |  |
|  | Alkyltin sulfide no. 13 from Table III | 0.03 | 10 | 10 | 10 | 9 | 8 | 7 | 6 | 6 | 5 | 5 |
|  | Zinc cmpd A from Table II | 0.15 |  |  |  |  |  |  |  |  |  |  |
|  | Ca(OH)$_2$ | 0.16 |  |  |  |  |  |  |  |  |  |  |
| 8 | Alkyltin mercaptide no. 9 from Table I | 0.075 |  |  |  |  |  |  |  |  |  |  |
|  | Alkyltin sulfide no. 15 from Table III | 0.075 | 10 | 9 | 9 | 8 | 7 | 7 | 6 | 6 | 5 | 3 |
|  | Zinc cmpd D from Table II | 0.20 |  |  |  |  |  |  |  |  |  |  |
|  | Ca(OH)$_2$ | 0.16 |  |  |  |  |  |  |  |  |  |  |
| 9 | Alkyltin mercaptide no. 4 from Table I | 0.10 |  |  |  |  |  |  |  |  |  |  |
|  | Zinc cmpd A from Table II | 0.18 | 10 | 10 | 10 | 9 | 9 | 8 | 7 | 7 | 6 | 6 |
|  | Ca(OH)$_2$ | 0.18 |  |  |  |  |  |  |  |  |  |  |
| 10 | Alkyltin mercaptide no. 2 from Table I | 0.10 |  |  |  |  |  |  |  |  |  |  |
|  | Zinc cmpd A from Table II | 0.16 | 10 | 10 | 10 | 9 | 8 | 8 | 7 | 6 | 6 | 5 |
|  | Ca(OH)$_2$ | 0.18 |  |  |  |  |  |  |  |  |  |  |
| 11 | Alkyltin mercaptide no. 3 from Table I | 0.12 |  |  |  |  |  |  |  |  |  |  |
|  | Zinc cmpd A from Table II | 0.16 | 10 | 10 | 9 | 9 | 8 | 8 | 7 | 7 | 6 | 5 |
|  | Ca(OH)$_2$ | 0.18 |  |  |  |  |  |  |  |  |  |  |
| 12 | Alkyltin mercaptide no. 1 from Table I | 0.070 |  |  |  |  |  |  |  |  |  |  |
|  | Alkyltin sulfide no. 9 from Table III | 0.030 |  |  |  |  |  |  |  |  |  |  |
|  | Zinc cmpd D from Table II | 0.20 | 10 | 10 | 9 | 9 | 8 | 7 | 6 | 6 | 5 | 5 |
|  | Ca(OH)$_2$ | 0.18 |  |  |  |  |  |  |  |  |  |  |
| 13* | Alkyltin mercaptide no. 1 from Table I | 0.10 | 10 | 10 | 10 | 9 | 8 | 6 | 5 | 3 | 0 | 0 |
|  | Zinc cmpd A from Table II | 0.20 |  |  |  |  |  |  |  |  |  |  |
| 14 | Alkyltin mercaptide no. 1 from Table I | 0.10 |  |  |  |  |  |  |  |  |  |  |
|  | Zinc cmpd A from Table II | 0.20 | 10 | 10 | 10 | 10 | 9 | 9 | 8 | 8 | 7 | 7 |
|  | Ca(OH)$_2$ | 0.20 |  |  |  |  |  |  |  |  |  |  |
| 15 | Alkyltin mercaptide no. 1 from Table I | 0.10 |  |  |  |  |  |  |  |  |  |  |

TABLE A-continued

| Ex. No. | Stabilizer Composition | Parts by Weight | \multicolumn{10}{c}{Minutes of Milling} |
|---|---|---|---|---|---|---|---|---|---|---|---|---|
| | | | 1 | 2 | 3 | 4 | 5 | 6 | 7 | 8 | 9 | 10 |
| | | | \multicolumn{10}{c}{Color} |
| | Zinc cmpd A from Table II | 0.20 | 10 | 10 | 10 | 10 | 9 | 9 | 8 | 7 | 6 | 5 |
| | Mg(OH)$_2$ | 0.20 | | | | | | | | | | |
| 16 | Alkyltin mercaptide no. 1 from Table I | 0.10 | | | | | | | | | | |
| | Zinc cmpd A from Table II | 0.20 | 10 | 10 | 10 | 10 | 9 | 9 | 8 | 8 | 7 | 7 |
| | Calcium acetate | 0.30 | | | | | | | | | | |
| 17 | Alkyltin mercaptide no. 1 from Table I | 0.10 | | | | | | | | | | |
| | Zinc cmpd A from Table II | 0.20 | 10 | 10 | 10 | 9 | 8 | 7 | 6 | 6 | 5 | 5 |
| | BaO | 0.20 | | | | | | | | | | |
| 18 | Alkyltin mercaptide no. 1 from Table I | 0.10 | | | | | | | | | | |
| | Zinc cmpd A from Table II | 0.20 | 10 | 9 | 9 | 8 | 8 | 7 | 7 | 6 | 5 | 5 |
| | LiOH | 0.20 | | | | | | | | | | |
| 19 | Alkyltin mercaptide no. 1 from Table I | 0.10 | | | | | | | | | | |
| | Zinc cmpd A from Table II | 0.20 | 10 | 10 | 10 | 10 | 9 | 8 | 7 | 6 | 3 | 2 |
| | Magnesium acetate | 0.20 | | | | | | | | | | |
| 20 | Alkyltin mercaptide no. 1 from Table I | 0.10 | | | | | | | | | | |
| | Zinc cmpd A from Table II | 0.20 | 10 | 10 | 10 | 10 | 9 | 8 | 7 | 5 | 4 | 1 |
| | Na$_3$BO$_4$ | 0.20 | | | | | | | | | | |
| 21 | Alkyltin mercaptide no. 1 from Table I | 0.10 | | | | | | | | | | |
| | Zinc cmpd A from Table II | 0.20 | 10 | 10 | 10 | 10 | 9 | 9 | 8 | 8 | 7 | 7 |
| | K$_2$CO$_3$ | 0.20 | | | | | | | | | | |
| 22 | Alkyltin mercaptide no. 1 from Table I | 0.10 | | | | | | | | | | |
| | Zinc cmpd A from Table II | 0.20 | 10 | 10 | 10 | 10 | 9 | 9 | 8 | 8 | 6 | 3 |
| | Sodium silicate | 0.20 | | | | | | | | | | |
| 23 | Alkyltin mercaptide no. 1 from Table I | 0.10 | | | | | | | | | | |
| | Zinc cmpd A from Table II | 0.20 | 10 | 10 | 10 | 8 | 7 | 7 | 6 | 6 | 6 | 5 |
| | Sodium propionate | 0.20 | | | | | | | | | | |
| 24 | Alkyltin mercaptide no. 1 from Table I | 0.10 | | | | | | | | | | |
| | Zinc cmpd A from Table II | 0.20 | 10 | 10 | 10 | 10 | 9 | 8 | 8 | 6 | 5 | 3 |
| | Barium acetate | 0.20 | | | | | | | | | | |

*For comparison only.

What I claim and desire to protect by Letters Patent is:

1. A composition for stabilizing halogen containing polymers comprising:

A. at least one alkyltin mercaptide having the formula:

$$R^1_a Sn + S-(CH_2)_x-COR)_{4-a} \quad (I)$$
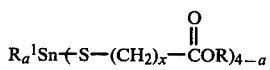

where
$R^1$ is $C_1$ to $C_{12}$ straight or branched chain alkyl;
R is $C_1$ to $C_{20}$ straight or branched chain, saturated or unsaturated alkyl;
a = 1 or 2; and
x = 1 or 2;

B. at least one zinc mercaptoester having the formula:

$$Zn + S-(CH_2)_x-COR)_2 \quad (II)$$
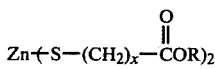

where x and R are as previously defined; and

C. at least one basic alkali or alkaline earth metal compound selected from the group consisting of oxides, hydroxides, sulfides, silicates, phosphates, borates and carbonates of alkali or alkaline earth metals.

2. The composition of claim 1 wherein the composition further comprises at least one alkyltin sulfide or oxide having the formula:

$$R^1-Sn-R^1 \quad (III)$$

where W is oxygen or sulfur and $R^1$ is as defined in claim 1.

3. The composition of claim 1 wherein the composition comprises about 5% to about 90% alkyltin mercaptide, about 5% to about 90% zinc mercaptoester and about 5% to about 60% basic alkali or alkaline earth metal compound, all percentages being by weight based on the total weight of the composition.

4. The composition of claim 2 wherein the alkyltin sulfide or oxide is employed in an amount up to 50% by weight of the combined weight of the alkyltin mercaptide and alkyltin sulfide or oxide.

5. The composition of claim 1 or 2 wherein the basic alkali or alkaline earth metal compound is Mg(OH)$_2$.

6. The composition of claim 1 or 2 wherein the basic alkali or alkaline earth metal compound is Ca(OH)$_2$.

7. A polymer composition stabilized against the deteriorative effects of heat comprising a halogen containing polymer and a stabilizingly effective amount of the composition of claim 1.

8. A polymer composition stabilized against the deteriorative effects of heat comprising a halogen containing polymer and a stabilizingly effective amount of the composition of claim 2.

9. A pipe comprising a halogen containing polymer and a stabilizingly effective amount of the composition of claim 1.

10. A pipe comprising a halogen containing polymer and a stabilizingly effective amount of the composition of claim 2.

* * * * *